BEST AVAILABLE COPY

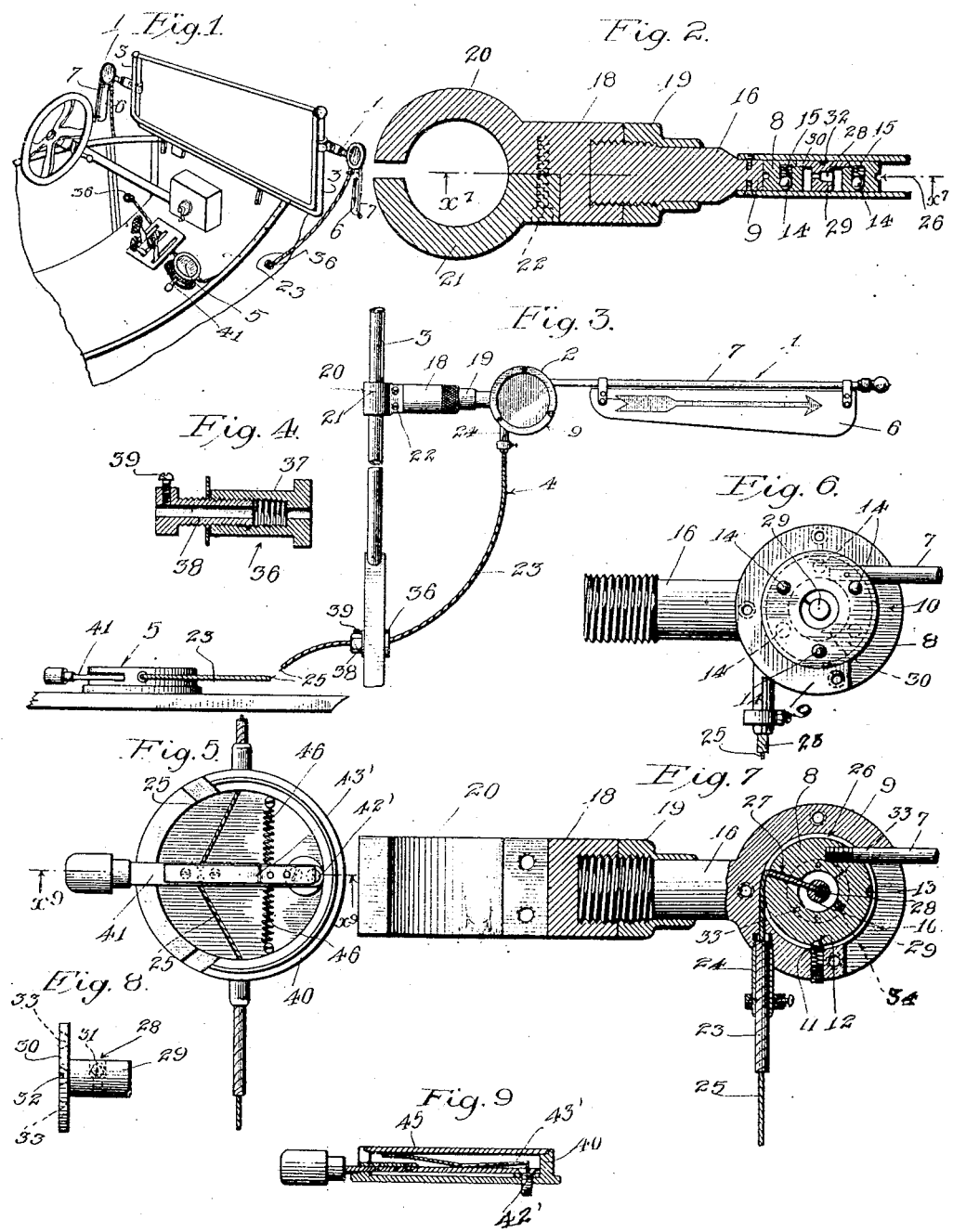

UNITED STATES PATENT OFFICE.

ARTHUR ST. CLAIR PERRY, OF LOS ANGELES, CALIFORNIA.

VEHICLE-SIGNAL.

1,204,186.  Specification of Letters Patent.  Patented Nov. 7, 1916.

Application filed April 28, 1913. Serial No. 764,267.

*To all whom it may concern:*

Be it known that I, ARTHUR ST. CLAIR PERRY, a citizen of the United States, residing at Los Angeles, in the county of Los Angeles, and State of California, have invented a new and useful Vehicle-Signal, of which the following is a specification.

This invention relates to vehicle signals and has for its object to provide a signal adapted to indicate the direction the vehicle is about to take, or to indicate that the vehicle is to come to a stop, and the objects of the invention are to provide a device of this character which is of simple construction, economical in manufacture, and efficient in use.

A further object is to provide for adjusting the operating connection.

Another object is to provide novel and efficient means for attaching the signal to the frame of the glass front.

Other advantages of the invention will be brought out in the following description.

Referring to the drawings: Figure 1 is a perspective view, showing the device equipped on an automobile. Fig. 2 is an enlarged sectional view of the signal support and turret. Fig. 3 is a rear elevation of the complete device, showing the signal elevated. Fig. 4 is a longitudinal section through the nipple used at the point where the operating connection passes through part of the vehicle. Fig. 5 is an enlarged plan view of the controlling box with cover removed. Fig. 6 is a rear elevation of the turret. Fig. 7 is a section on line $x^7$—$x^7$, Fig. 2, showing the parts in position with the signal raised. Fig. 8 is a side elevation in detail of the adjusting reel. Fig. 9 is a section on line $x^9$—$x^9$, Fig. 5. Fig. 10 is a partial enlarged view of the controlling lever showing grip hole.

The device comprises, in general, a semaphore 1, which is pivotally supported from a turret 2, the latter being supported at any desired part of the vehicle, for example, by the frame of the glass front 3. A connection 4 extends from the turret 2 to a controlling lever 5 which may be located at any convenient point to be operated either by the foot or hand.

It should be understood that at least two of these signals should be used, one at least, being arranged on each side of the vehicle. The signal blade 6 is carried on a rod 7, the latter being screwed into a disk 8 and pinned. The disk 8 is revolubly mounted within a box 9 and the box has a segmental recess 10 to permit the passage of the rod 7, permitting the rod to move through an arc of ninety degrees. To detachably lock the disk 8 in either of the two positions of the signal, I provide a spring pressed ball 11 which is adapted to engage in the recess 12 or 13 formed in the periphery of the disk 8. In order to prevent rattling of the disk 8, two sets of balls 14 are employed, which project slightly from opposite sides of the disk and bear against the adjacent walls of the box 9. The balls of the two sets are staggered as shown in Fig. 6, and spring 15 yieldingly presses the balls outwardly. The box 9 has a stem 16 which is screwed into a threaded socket 18, a threaded sleeve 19 acting as a lock nut and at the same time serving to cover the exposed threads on the stem 16 and present a finished appearance. The socket 18 is formed with a split eye 20, one section 21 of which is removable and is secured to the other section by screws 22. The removable eye section 21 enables the device to be readily applied to the frame of the glass front 3, as indicated in Figs. 1 and 3.

A Bowden shaft 23 is secured to the box 9, passing into a nipple 24 screwing into the box 9, and the inner cord 25 passes into a groove 26 formed in the periphery of the disk 8 and thence passes radially through a hole 27 to the center of the disk, and then passes through a hole 28 formed in the hub 29 of an adjusting disk 30. The hole 28 is counter-sunk to receive a knot 31 in the end of the cord 25, as clearly shown in Fig. 2. The disk 30 lies in a recess formed in the disk 8 and is slotted at 32 to receive a screw driver for turning it to wind the cord 25 to take up slack in the cord. To hold the disk 30 from turning normally, the disk is provided with a series of depressions 33, any one of which is adapted to be engaged by a screw 34 which passes through the wall of the box 9. When the cord 25 is to be adjusted, the screw 34 is first removed and then a screw driver is inserted into the slot 32 and the disk 30 turned the desired amount, after which screw 34 is again reengaged in one of the recesses 33.

The Bowden shaft 23 extends through a thimble 36 which is arranged in the part of the vehicle through which the shaft passes, and prevents chafing of the vehicle at this point, in addition to presenting a neat appearance and properly supporting the Bowden shaft. This thimble, as clearly shown in Fig. 4, consists of a flanged sleeve 37 which is internally threaded and receives a hollow bolt 38. A setscrew 39 in the head of the bolt 38 serves to clamp the Bowden shaft in position, preventing it from shifting and wearing.

The shaft 23 passes into a controlling box 40 and the cord 25 is secured to an arm 41. The cord 25 which leads from the signal device on the opposite side of the vehicle also extends through the opposite side of the box 40 and is likewise secured to the controlling lever 41 by being passed through holes 42 and retained by a plate 43. The controlling lever 41 is pivoted on a screw 42' and a flat spring 43' is fastened on the controlling lever and its end sweeps against the inner face of the cover 45 of the box 40, and prevents rattling. In order to hold the controlling lever in a central position, two opposing coil springs 46 are employed which are connected to the box 40 and to the controlling lever 41.

In operation, when the driver intends to turn to the right, he swings the controlling lever to the left, thereby drawing on the right hand cord 25, and pulling up the right hand signal, this movement of the lever simply furnishing slack in the opposite cord 25 and not affecting the signal on the left. If the driver intends to turn to the left, he swings the controlling lever to the right, which pulls the left hand cord and swings the left hand signal up into indicating position, at the same time placing slack on the opposite cord 25, so that the right hand signal remains in depressed position.

What I claim is:—

1. In an automobile signal a support, a disk revoluble upon the support, a semaphore carried by the disk, a revoluble element, means for supporting the revoluble element near the center of the disk and being adjustably secured to the disk, and a flexible element passing through the disk and being connected at one end with the revoluble element.

2. In an automobile signal a support, means to connect the support with an automobile, a disk having an apertured center revolubly mounted upon the support, a semaphore secured rigidly with the disk and extending outwardly therefrom, a revoluble element mounted within the aperture within the disk, means to adjustably secure the revoluble element to the disk, said disk having an opening extending from its inner periphery to its outer periphery, and a flexible element extending through said opening and being connected with the revoluble element.

3. An automobile signal comprising a turret consisting of a disk, a head in which said disk revolves, spring pressed balls projecting laterally from said disk to hold the same against rattling in said head, a rod screwed tangentially into said disk, said head having a segmental peripheral recess to receive said rod and permit the same to be swung through an arc, a semaphore carried by said rod, means for securing said head to the automobile, and means for turning said turret.

4. An automobile signal comprising a turret consisting of a disk, a head in which said disk revolves, spring pressed balls projecting laterally from said disk to hold the same against rattling in said head, a rod screwed tangentially into said disk, said head having a segmental peripheral recess to receive said rod and permit the same to be swung through an arc, a semaphore carried by said rod, means for securing said head to the automobile, a revoluble disk in the first disk, said first disk having a radial hole, a flexible connection extending through said head and through said radial hole, the end of said flexible connection being secured to said revoluble disk, and means for holding said revoluble disk adjustably secured to the first disk whereby the slack in the flexible connection may be taken up without altering the angular position of the first disk.

In testimony whereof I have hereunto set my hand at Los Angeles, California, this 14th day of April, 1913.

ARTHUR ST. CLAIR PERRY.

In presence of—
  G. T. HACKLEY,
  MARTHA M. LANGE.